(12) United States Patent
Sides et al.

(10) Patent No.: US 12,433,248 B2
(45) Date of Patent: Oct. 7, 2025

(54) SMART PET FEEDER

(71) Applicant: TH Products, LLC, San Antonio, TX (US)

(72) Inventors: Paul B. Sides, San Antonio, TX (US); Brett Jarriel, Aiken, SC (US); Christopher Lewis Blood, San Antonio, TX (US)

(73) Assignee: TH Products, LLC, San Antonio, TX (US)

( * ) Notice: Subject to any disclaimer, the term of this patent is extended or adjusted under 35 U.S.C. 154(b) by 29 days.

(21) Appl. No.: 18/434,758

(22) Filed: Feb. 6, 2024

(65) Prior Publication Data
US 2024/0268341 A1 Aug. 15, 2024

Related U.S. Application Data

(60) Provisional application No. 63/445,629, filed on Feb. 14, 2023.

(51) Int. Cl.
A01K 5/02 (2006.01)
A01K 5/01 (2006.01)

(52) U.S. Cl.
CPC .......... *A01K 5/0225* (2013.01); *A01K 5/0114* (2013.01); *A01K 5/0275* (2013.01)

(58) Field of Classification Search
CPC ... A01K 5/0225; A01K 5/0114; A01K 5/0275
See application file for complete search history.

(56) References Cited

U.S. PATENT DOCUMENTS

| 3,340,851 A | 9/1967 | Frank et al. | |
|---|---|---|---|
| D278,169 S | 3/1985 | Cargile, Jr. | |
| 4,986,220 A * | 1/1991 | Reneau | A01K 5/0225 119/57.91 |
| 5,143,289 A * | 9/1992 | Gresham | A01K 5/0291 239/70 |
| 5,245,949 A * | 9/1993 | Hively | A01K 5/0225 119/53 |

(Continued)

OTHER PUBLICATIONS

EdgeAnt Automatic Cat Feeders, posted Oct. 17, 2022 [online], [retrieved Nov. 27, 2024]. Retrieved from Internet, https://www.amazon.ca/dp/B0BJDYW7XR (Year:2024).

(Continued)

*Primary Examiner* — William L Gmoser
(74) *Attorney, Agent, or Firm* — Alex H. Huffstutter; Stephen H. Hall; Bradley Arant Boult Cummings LLP

(57) ABSTRACT

A smart pet feeder assembly may include a hopper, a feed chute configured to direct feed towards a bowl, and a feed dispensing assembly configured to selectively deliver feed from the hopper to the feed chute. The feed dispensing assembly may include a spin plate, a motor mount, a motor, and one or more of a diverter blade or a center spacer. The spin plate may be configured to receive feed from the hopper. The motor mount may be configured to be supported by one of the hopper or the feed chute, and to support the motor and spin plate. The diverter blade may include a feed engagement portion for redirecting the feed received by the spin plate off of the spin plate. The center spacer may be positioned on the on the spin plate and be configured to divert feed away from a center of the spin plate.

20 Claims, 15 Drawing Sheets

(56) References Cited

U.S. PATENT DOCUMENTS

| | | | |
|---|---|---|---|
| D364,942 S | 12/1995 | VanSkiver et al. | |
| 5,588,394 A | 12/1996 | Balistreri | |
| D408,207 S | 4/1999 | Bourke | |
| 6,378,460 B1 | 4/2002 | Skurdalsvold et al. | |
| D457,692 S | 5/2002 | Skurdalsvold et al. | |
| D503,247 S | 3/2005 | Ross | |
| 7,146,930 B1 | 12/2006 | Ness | |
| 7,798,098 B1 * | 9/2010 | Patterson | A01K 5/0225 119/51.11 |
| 7,866,579 B2 * | 1/2011 | Chism | A01C 17/006 119/57.91 |
| 8,698,013 B1 * | 4/2014 | Hall | A01K 5/0225 119/51.01 |
| 8,833,303 B1 * | 9/2014 | Linder | A01K 5/0225 119/57.91 |
| 9,198,398 B2 | 12/2015 | Rogers | |
| 9,301,495 B1 * | 4/2016 | Bogart | A01K 5/005 |
| 9,345,231 B2 | 5/2016 | Jalbert et al. | |
| D759,905 S | 6/2016 | Stewart et al. | |
| 9,635,835 B1 * | 5/2017 | West | A01K 5/004 |
| 9,700,014 B1 * | 7/2017 | Bogart | A01K 5/0225 |
| 9,750,229 B2 | 9/2017 | Stewart | |
| 9,901,072 B2 * | 2/2018 | Moyer | A01K 5/0291 |
| 10,098,321 B2 | 10/2018 | McKay | |
| D835,356 S | 12/2018 | Xie | |
| D836,850 S | 12/2018 | Li | |
| D843,665 S | 3/2019 | Zeng | |
| D844,258 S | 3/2019 | Xu | |
| D876,022 S | 2/2020 | Hua et al. | |
| D884,986 S | 5/2020 | Chen et al. | |
| D885,685 S | 5/2020 | Chen et al. | |
| D885,686 S | 5/2020 | Chen et al. | |
| D893,109 S | 8/2020 | Zeng | |
| D897,609 S | 9/2020 | Loiseau | |
| D918,489 S | 5/2021 | Sayers | |
| D920,592 S | 5/2021 | Tang | |
| 11,083,187 B1 * | 8/2021 | McCoy | A01K 5/0225 |
| D940,404 S | 1/2022 | Dong | |
| D945,713 S | 3/2022 | Zeng | |
| D948,263 S | 4/2022 | Robinson et al. | |
| D963,256 S | 9/2022 | Lin | |
| D965,232 S | 9/2022 | Chen et al. | |
| D980,547 S | 3/2023 | Wang | |
| D983,463 S | 4/2023 | Chen | |
| D984,193 S | 4/2023 | Baerenwald et al. | |
| D987,203 S | 5/2023 | Ren | |
| D989,411 S | 6/2023 | Sun | |
| D993,704 S | 8/2023 | Baerenwald et al. | |
| D999,459 S | 9/2023 | Sun | |
| D1,002,957 S | 10/2023 | Yu | |
| D1,006,343 S | 11/2023 | Xiong | |
| 11,856,925 B1 * | 1/2024 | Sanderford | A01K 5/0225 |
| D1,025,504 S | 4/2024 | Lu et al. | |
| D1,027,321 S | 5/2024 | Yu | |
| D1,029,406 S | 5/2024 | Sides et al. | |
| D1,037,574 S | 7/2024 | Zou | |
| D1,048,581 S | 10/2024 | Wang | |
| 12,102,064 B1 * | 10/2024 | Yang | A01K 5/0114 |
| 2006/0196433 A1 | 9/2006 | Ness | |
| 2013/0092090 A1 | 4/2013 | McCallum | |
| 2013/0213308 A1 | 8/2013 | Koskey, Jr. | |
| 2015/0068463 A1 | 3/2015 | Worry | |
| 2015/0145644 A1 | 5/2015 | Jalbert et al. | |
| 2015/0164044 A1 | 6/2015 | Powers | |
| 2019/0059322 A1 | 2/2019 | Xu | |
| 2019/0099779 A1 * | 4/2019 | Farmer | E01C 19/203 |
| 2019/0246599 A1 * | 8/2019 | Byrum | A01K 5/0291 |
| 2020/0045942 A1 * | 2/2020 | Pfeiff | A01K 5/0225 |
| 2020/0100460 A1 | 4/2020 | Chen et al. | |
| 2022/0039351 A1 * | 2/2022 | Kim | A01K 5/0291 |
| 2023/0023816 A1 | 1/2023 | Xue | |
| 2023/0032509 A1 * | 2/2023 | Michalec | A01K 5/0225 |
| 2023/0225287 A1 | 7/2023 | Yu | |
| 2023/0240257 A1 | 8/2023 | Zhang et al. | |

OTHER PUBLICATIONS

Gluckpet Cat and Dog Feeder with Camera, posted Aug. 11, 2022 [online], [retrieved Nov. 27, 2024]. Retrieved from internet, https://www.amazon.co.uk/dp/B0B94KLW2P (Year: 2024).

Petlibro Automatic Cat Feeder, posted May 1, 2020 [online], [retrieved Nov. 26, 2024]. Retrieved from internet, https://www.amazon.com/dp/B0854HDNHN?th=1 (Year: 2024).

SimplePet Blazer Large Capacity Automatic Dog Feeder, posted Sep. 30, 2024 [online], [retrieved Jan. 3, 2025]. Retrieved from internet, https://www.amazon.com/dp/B0DJ9MF591/ (Year: 2025).

* cited by examiner

SMART PET FEEDER

CROSS-REFERENCE TO RELATED APPLICATIONS

This application claims the benefit of the following patent application which is hereby incorporated by reference in its entirety: U.S. Provisional Application No. 63/445,629 filed Feb. 14, 2023, entitled "Pet Feeder."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

1. Field of the Invention

The present disclosure relates generally to an improved pet feeder.

2. Description of the Prior Art

Accurate release of pet food (e.g., kibble) is vital to teaching eating habits to pets and controlling the amount of food for a healthy, consistent diet. Many current pet feeders on the market are not accurate in the amount of food that is released to pets which leads to overfeeding or inconsistent meal size. Many pet feeders are not capable of feeding a variety of kibble, especially large and extra-large kibble. Thus, an improved pet feeder that allows for more carefully measured feeding portions and that provides for interaction with pets is desired.

BRIEF SUMMARY

In some embodiments, an improved pet feeder is provided that uses a motor, such as a stepper or gear motor, to provide a much more precise release of pet food. The gear motor provides a much more controlled number of revolutions, as well as controlled speed, than traditional motors used in most pet feeders. This more precise revolution gives a more exact release of food but also has additional benefits, including increased reliability. In addition to the more precise feedings, in some embodiments of the invention, users can interact with the feeder via a mobile phone application (e.g., using video and audio), and can also set a timer to release the food or trigger a feeding. Additionally, benefits of the smart pet feeder include remote cameras to check in on users' pets, wi-fi connectivity, food level sensors, and voice messages recorded on the feeder for the pet to hear at feeding time.

In a particular embodiment, an exemplary smart pet feeder system as disclosed herein may include a hopper, a spin plate, a motor, and a feed chute. The spin plate may be configured to receive feed from the hopper. The motor may be attached to the spin plate and may further be operatively connected to a programable circuit board. The feed chute may be configured to receive feed from the spin plate and direct the feed to a bowl.

In an exemplary aspect according to the above-referenced embodiment, the hopper may include an oval-shaped lower opening.

In another exemplary aspect according to the above-referenced embodiment, the smart pet feeder system may further include a center spacer positioned on the spin plate. The center spacer may be configured to divert feed away from a center of the spin plate.

In another exemplary aspect according to the above-referenced embodiment, the center spacer may be rectangular-shaped.

In another exemplary aspect according to the above-referenced embodiment, the smart pet feeder system may further include a diverter blade extending along an upper portion of the spin plate.

In another exemplary aspect according to the above-referenced embodiment, the smart pet feeder system may further include a motor mount coupled to the feed chute and configured to receive the motor. The diverter blade may be coupled to the motor mount.

In another exemplary aspect according to the above-referenced embodiment, the spin plate may include an upwardly angled outer rim portion. A feed engagement portion of the diverter blade may extend along at least the upwardly angled outer rim portion.

In another exemplary aspect according to the above-referenced embodiment, a feed engagement portion of the diverter blade may be wedge-shaped having a terminal end width wider than a proximal end width.

In another exemplary aspect according to the above-referenced embodiment, a feed engagement portion of the diverter blade may include forward and rearward edges angled relative to a center line of the diverter blade at a wedge angle between zero degrees and twenty degrees. The center line may be parallel to the y-axis.

In another exemplary aspect according to the above-referenced embodiment, a feed engagement portion of the diverter blade may include forward and rearward edges angled relative to a center line of the diverter blade at a ramp angle between zero degrees and thirty degrees. The center line may be parallel to the z-axis.

In another exemplary aspect according to the above-referenced embodiment, the smart pet feeder system may further include a motor mount coupled to one of the feed chute or the hopper and configured to receive the motor.

In another exemplary aspect according to the above-referenced embodiment, the motor mount may include at least two support arms coupled to the feed chute.

In another embodiment, a feed dispensing assembly is disclosed herein for use with a smart pet feeder system including a hopper and a feed chute configured to direct feed towards a bowl. The feed dispensing assembly may include a spin plate, a motor mount, a motor, and a diverter blade. The spin plate may be configured to receive feed from the hopper. The motor mount may be configured to be supported by one of the hopper or the feed chute. The motor may be received by the motor mount and attached to the spin plate. The motor may be configured to cause the spin plate to rotate. The diverter blade may be coupled to the motor mount. The diverter blade may include a feed engagement portion configured to extend along at least a portion of the spin plate for redirecting the feed received by the spin plate off of the spin plate.

In an exemplary aspect according to the above-referenced embodiment, the motor mount may include at least one support arm. The diverter blade may include a mounting portion coupled to the at least one support arm of the motor mount.

In another exemplary aspect according to the above-referenced embodiment, the feed dispensing assembly may further include a center spacer positioned on the spin plate and configured to divert feed away from a center of the spin plate.

In another exemplary aspect according to the above-referenced embodiment, the feed engagement portion of the diverter blade may include forward and rearward edges angled relative to a center line of the diverter blade at a wedge angle between zero degrees and twenty degrees.

In another exemplary aspect according to the above-referenced embodiment, the feed engagement portion of the diverter blade may include forward and rearward edges angled relative to a center line of the diverter blade at a ramp angle between zero degrees and thirty degrees.

In another exemplary aspect according to the above-referenced embodiment, the spin plate may include an upwardly angled outer rim portion. The feed engagement portion of the diverter blade may extend along at least the upwardly angled outer rim portion.

In a further embodiment, a feed dispensing assembly is disclosed herein for use with a smart pet feeder system including a hopper and a feed chute configured to direct feed towards a bowl. The feed dispensing assembly may include a spin plate, a motor mount, a motor, and a center spacer. The spin plate may be configured to receive feed from the hopper. The motor mount may be configured to be supported by one of the hopper or the feed chute. The motor may be received by the motor mount and attached to the spin plate. The motor may be configured to cause the spin plate to rotate. The center spacer may be positioned on the spin plate and may further be configured to divert feed away from a center of the spin plate.

In an exemplary aspect according to the above-referenced embodiment, the feed dispensing assembly may further include a diverter blade coupled to the at least one support arm of the motor mount. The diverter blade may include a feed engagement portion configured to extend along at least a portion of the spin plate for redirecting the feed received by the spin plate off of the spin plate.

Figure 14A:
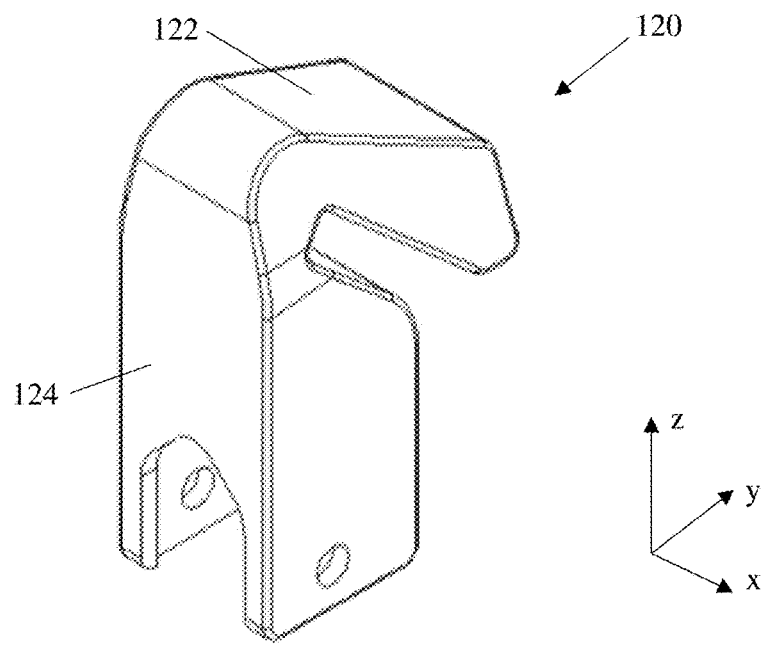
FIG. 14A is a perspective view of a diverter blade of the smart pet feeder system of FIG. 8 in accordance with the present disclosure.
Figure 14B:
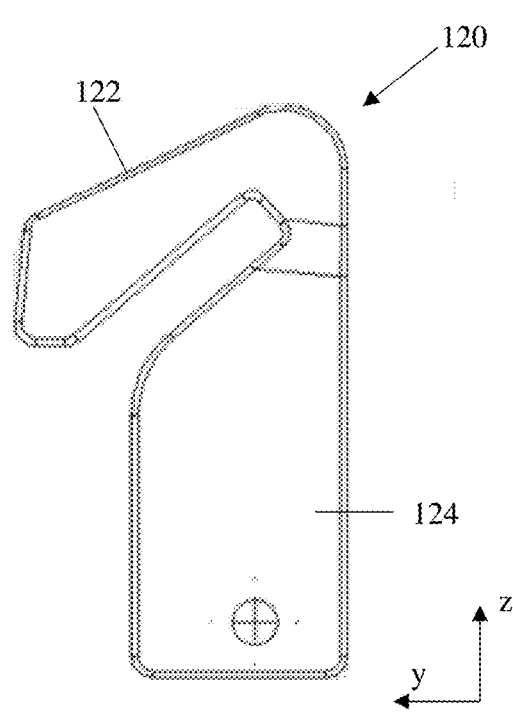
Figure 14C:
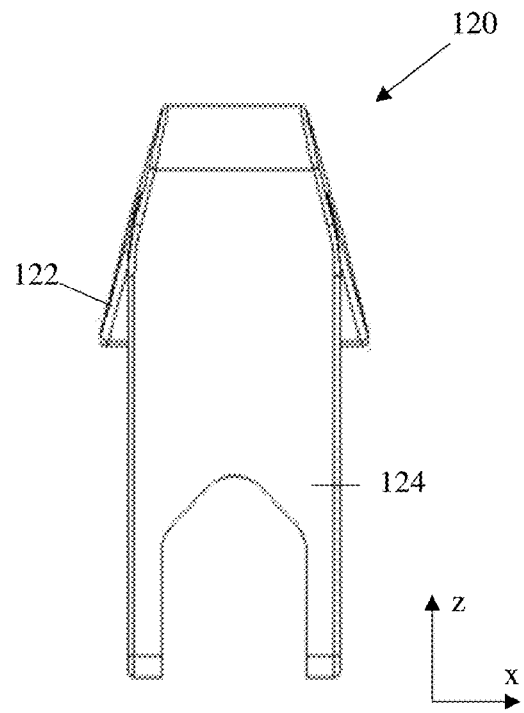

14B is a side elevation view of the diverter blade of FIG. 14A in accordance with the present disclosure.

14C is a rear elevation view of the diverter blade of FIG. 14A in accordance with the present disclosure.

14D is a top plan view the diverter blade of FIG. 14A in accordance with the present disclosure.

Figure 14D:
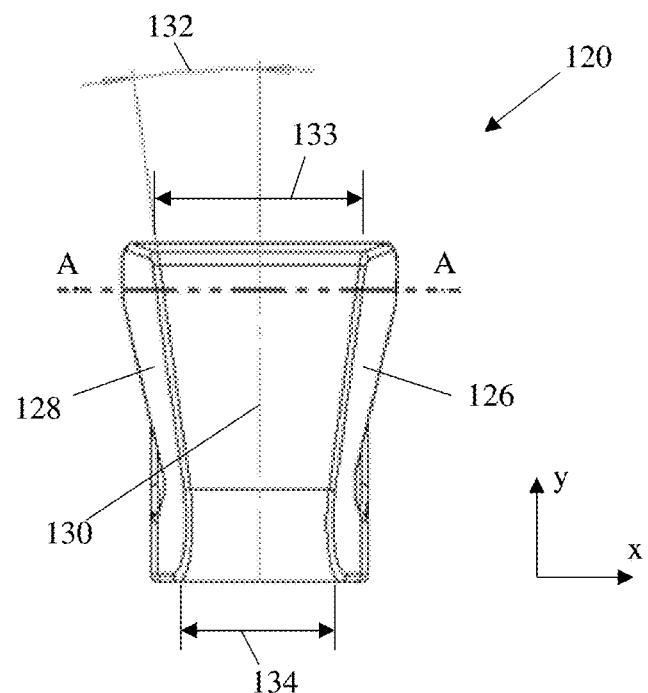

14E is a cross-sectional front elevation view of the diverter blade of FIG. 14A taken along line A-A of FIG. 14D in accordance with the present disclosure.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

FIGS. 1-4 show various different sizes and configurations of various embodiments of smart pet feeder systems 5 as described herein. As understood herein, the various embodiments of the smart pet feeder system may be scaled to accommodate or hold 10 lbs, 20 lbs, 40 lbs, or some other amount of food. As shown in FIGS. 1-4, the bowl and bowl housings can have different sizes, shapes, and configurations. In some embodiments, the bowl housing is detachable from the base so that a user may use different bowl configurations without replacing the entire feeder.

FIGS. 5-10 show several views of one embodiment of the smart pet feeder system 5 and its various feeder components, including the feeder housing 7, a hopper 10, feed chute 70, a base 80, a bowl 90 and a bowl housing 100. The hopper 10 may be configured to store feed and the feed chute 70 may be configured to direct the pet food (referred to herein as kibble or feed) from the hopper 10 into the bowl 90. The smart pet feeder system 5 may further include a lid 8 coupled to the feeder housing 7 and configured to allow access to the hopper 10, as well as one or more seals 9 positioned between the lid 8 and the feeder housing 7. The one or more seals 9 may be configured to prevent excess moisture from contacting the feed and causing the feed to become stale or bunching up.

Figure 6:
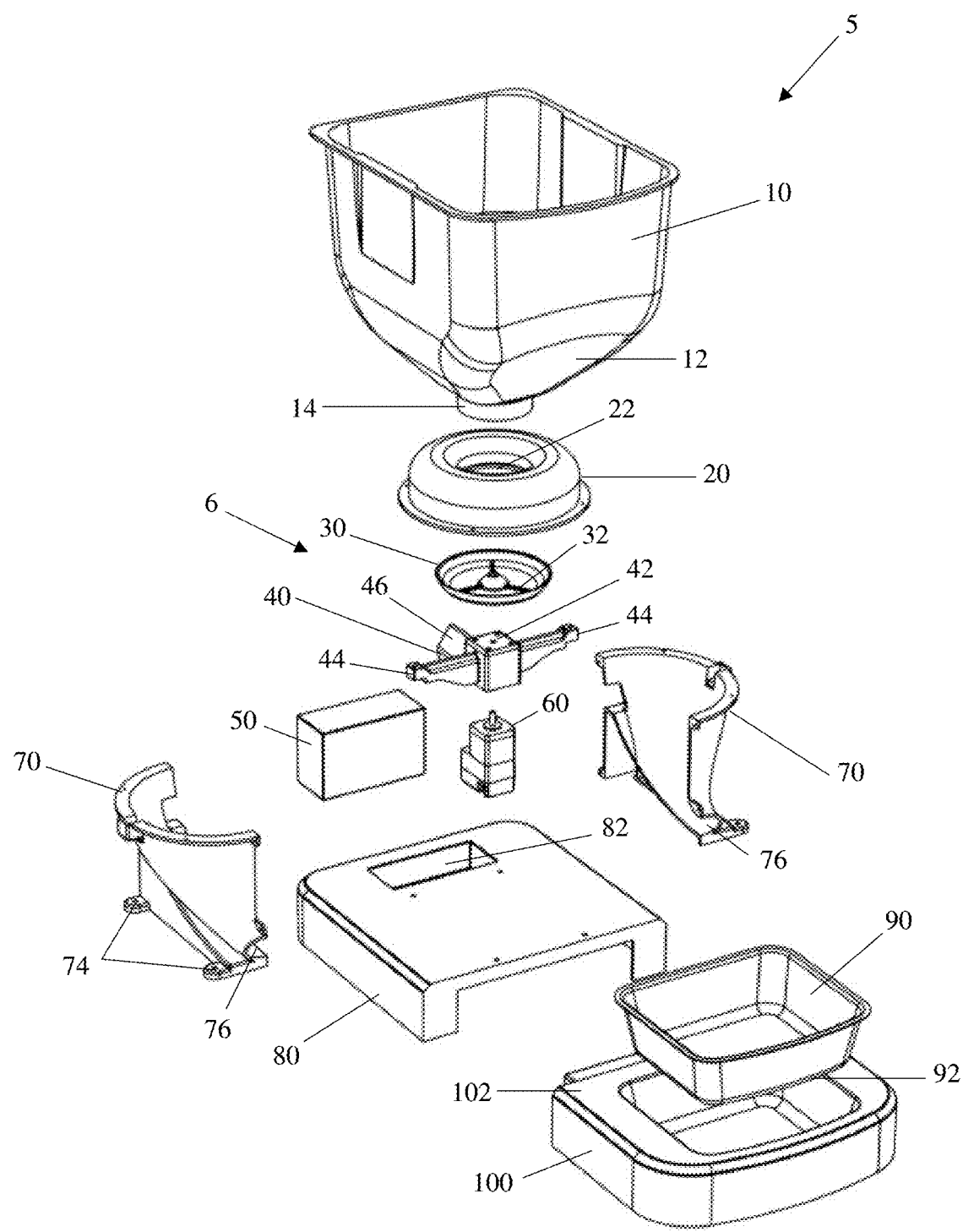
FIG. 6 is an enlarged exploded perspective view of the smart pet feeder system of FIG. 5 in accordance with the present disclosure.
Figure 13:
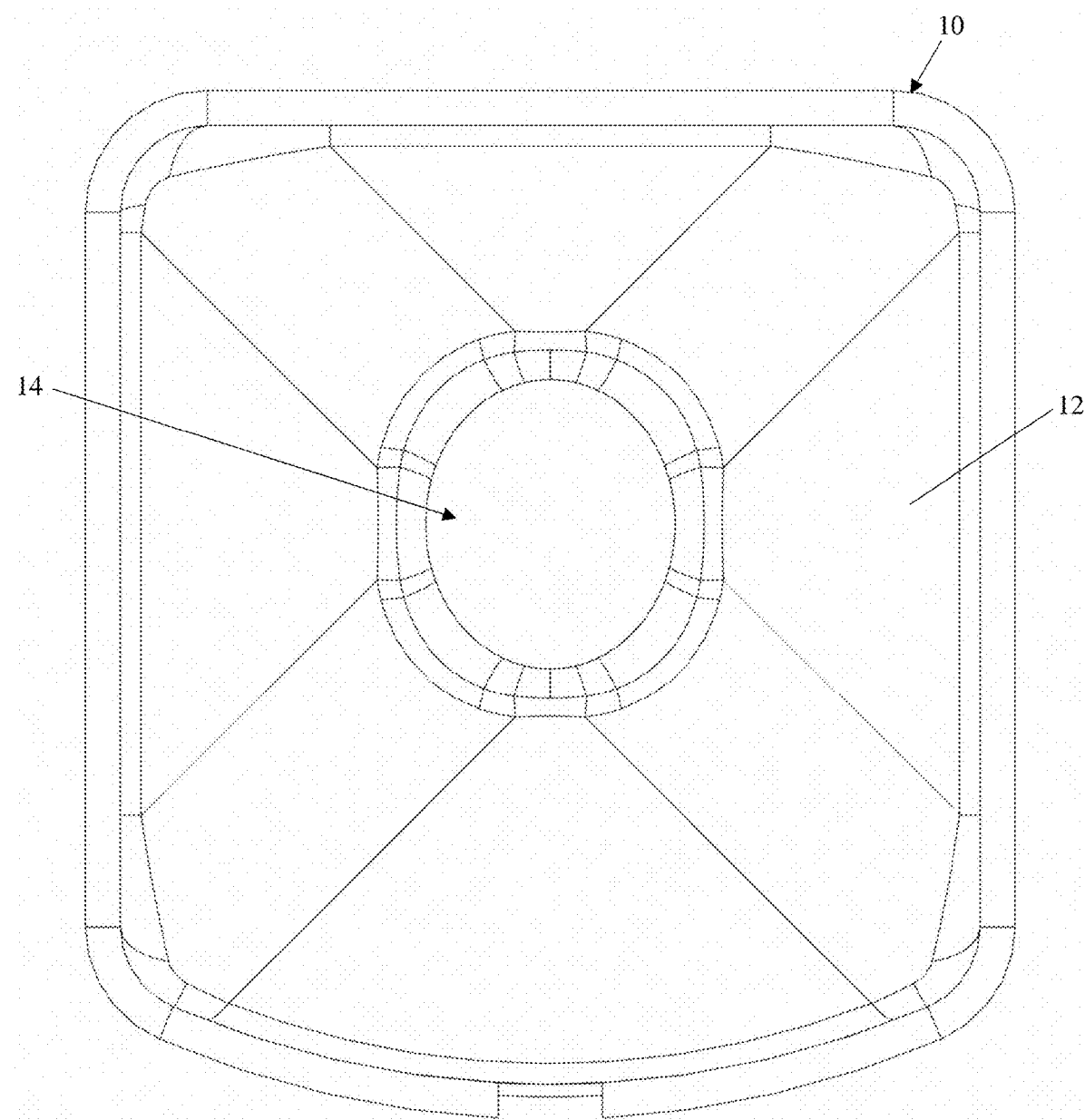
FIG. 13 is a top plan view of a hopper of the smart pet feeder system of FIG. 8 in accordance with the present disclosure.

FIG. 6 is an exploded view showing certain components of one embodiment of a feed dispensing assembly 6 of the smart pet feeder system 5. In this embodiment, the feed dispensing assembly 6 may comprise a spin plate cover 20, a spin plate 30, a motor bracket 40, and a motor 60. The motor 60 may be powered using an external source, or as illustrated, using a battery 50. In accordance with the embodiment shown in FIG. 6, the motor 60 may be a stepper motor. The hopper 10 is configured to hold the food until it is ready for dispensing. As described above, the hopper 10 may have different sizes, for example, big enough to hold 10 lbs, 20 lbs, or more of pet food. The hopper 10 has a funnel portion 12 leading to a lower opening 14 configured to interface with the spin plate cover 20, and allow feed to be dispensed onto the spin plate 30. In certain optional embodiments, as illustrated in FIG. 13, the lower opening 14 of the hopper 10 may be oval-shaped. The oval-shape of the lower opening 14 improves feed flow and helps prevent the feed from clogging up, which may be an issue with round openings. In other optional embodiments, the lower opening 14 can take various shapes; for instance, square, triangular, egg-shaped, and other geometric configurations configured to efficiently avoid clogging.

When a feeding is triggered, the motor 60 is activated which turns the spin plate 30. The spin plate cover 20 has a spin plate cover opening 22 configured to receive the funnel portion 12 and lower opening 14 of the hopper 10. Feed from the hopper 10 may pass through the spin plate cover opening 22 and on to the spin plate 30. When not spinning, food from the hopper 10 generally sits on the spin plate 30 but does not generally spill over into the feed chute 70. The spin plate 30 may include an upwardly angled outer rim portion 34 to help prevent food from spilling over into the feed chute 70 when not spinning. The upwardly angled outer rim portion 34 may also be referred to herein as an upper portion 34 of the spin plate 30. Ridges 32 may be designed onto the spin plate 30 to help agitate the feed and direct the feed outwardly using centrifugal forces. When a feeding occurs, and the motor 60 is activated, and the spin plate 30 begins to spin, the food on the spin plate 30 is cast outwardly agitated by the ridges 32 and into the feed chute 70, and gravity fed through the feed chute opening 76 into the bowl 90. The bowl 90 may include a rubber base 92 configured to reduce the sound of the feed as it is dispensed into the bowl 90. The feed chute 70 has an upper diameter larger than a diameter of the spin plate 30, thus allowing the food to be dispensed off the spin plate 30 and into the feed chute 70.

As described above, the bowl housing 100 may be connected to, but detachable from, the base 80. This allows a user to remove the bowl housing 100 and bowl 90, for cleaning. The bowl 90 may also be removeable from the bowl housing 100. A bowl mounting plate 102 may be connected to the bowl housing 100 and may be removed and replaced with a different shaped mounting plate for installing an alternative bowl shape configuration.

The feed chute 70 may be arranged as two or more separating pieces that can be connected together. The feed chute 70 forms a cavity at the top opening. The feed chute 70 assembly has a smaller cavity at the bottom in the front of the unit, the feed chute opening 76, where the feed is released into the bowl 90 at the front of the smart pet feeder system 5. The feed chute 70 may be connected to the base 80 in any conventional manner, for example, by screws 74, plastic molded fasteners, or snap-locked thereto.

As illustrated in FIGS. 5-10, the base 80 may also have a battery recess 82 configured to receive a battery 50. The battery recess 82 may be positioned proximate to the sloped edge of the feed chute 70, for example, near a rear edge of the base 80.

Figure 11:
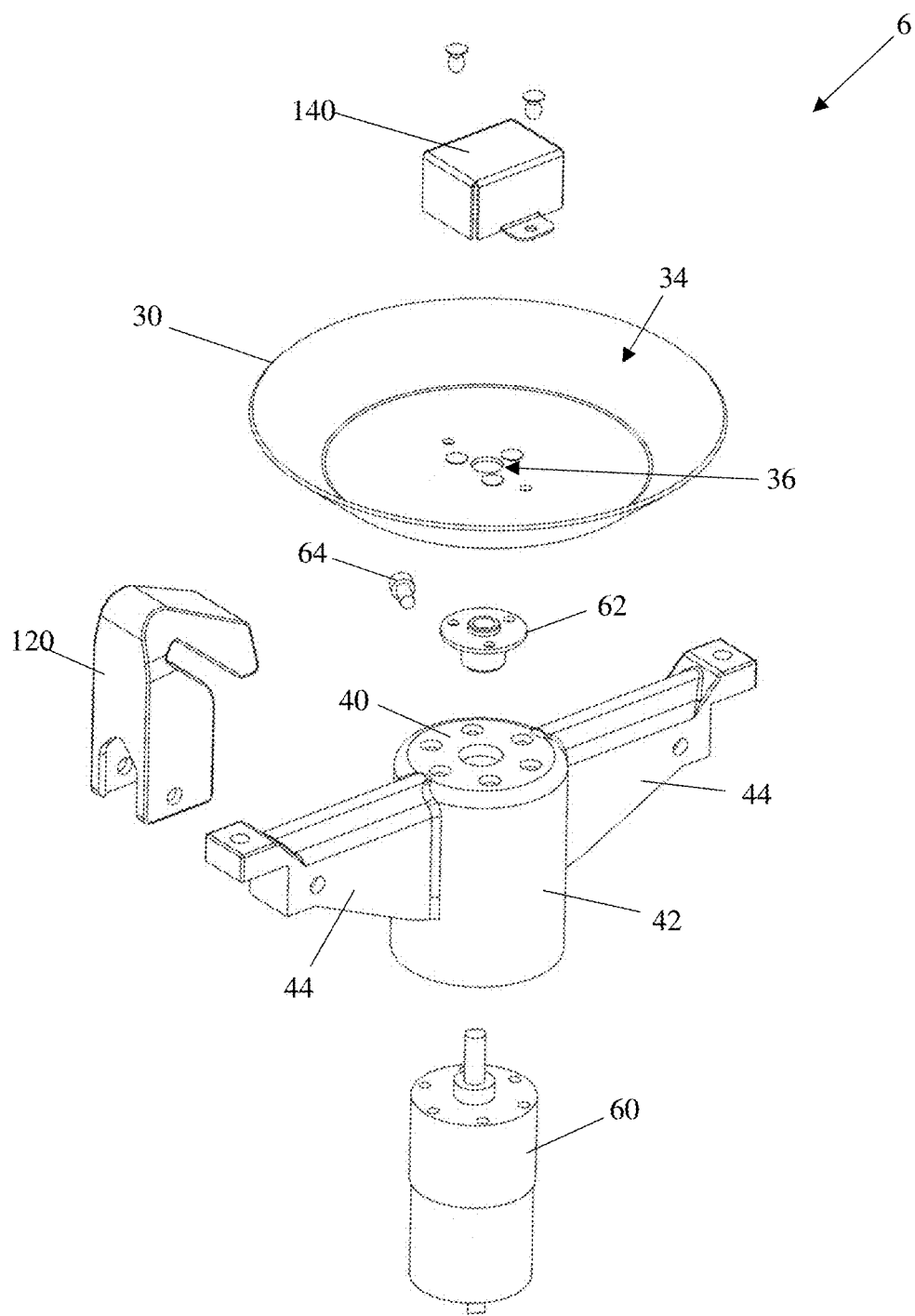
FIG. 11 is an exploded perspective view of a feed dispensing assembly of the smart pet feeder system of FIG. 8 in accordance with the present disclosure.

As illustrated in FIG. 6, the motor bracket 40 may have a center housing 42, two supporting arms 44, and a support flange 46. As illustrated in FIG. 11, the motor bracket 40 may only include a center housing 42 and two supporting arms 44. The two supporting arms 44 rest in corresponding feed chute notches 72 formed near an upper lip of feed chute 70. The support flange 46, when present, may rest against the inside surface of the feed chute 70 to help secure and stabilize the motor bracket 40 in place.

Figure 1:
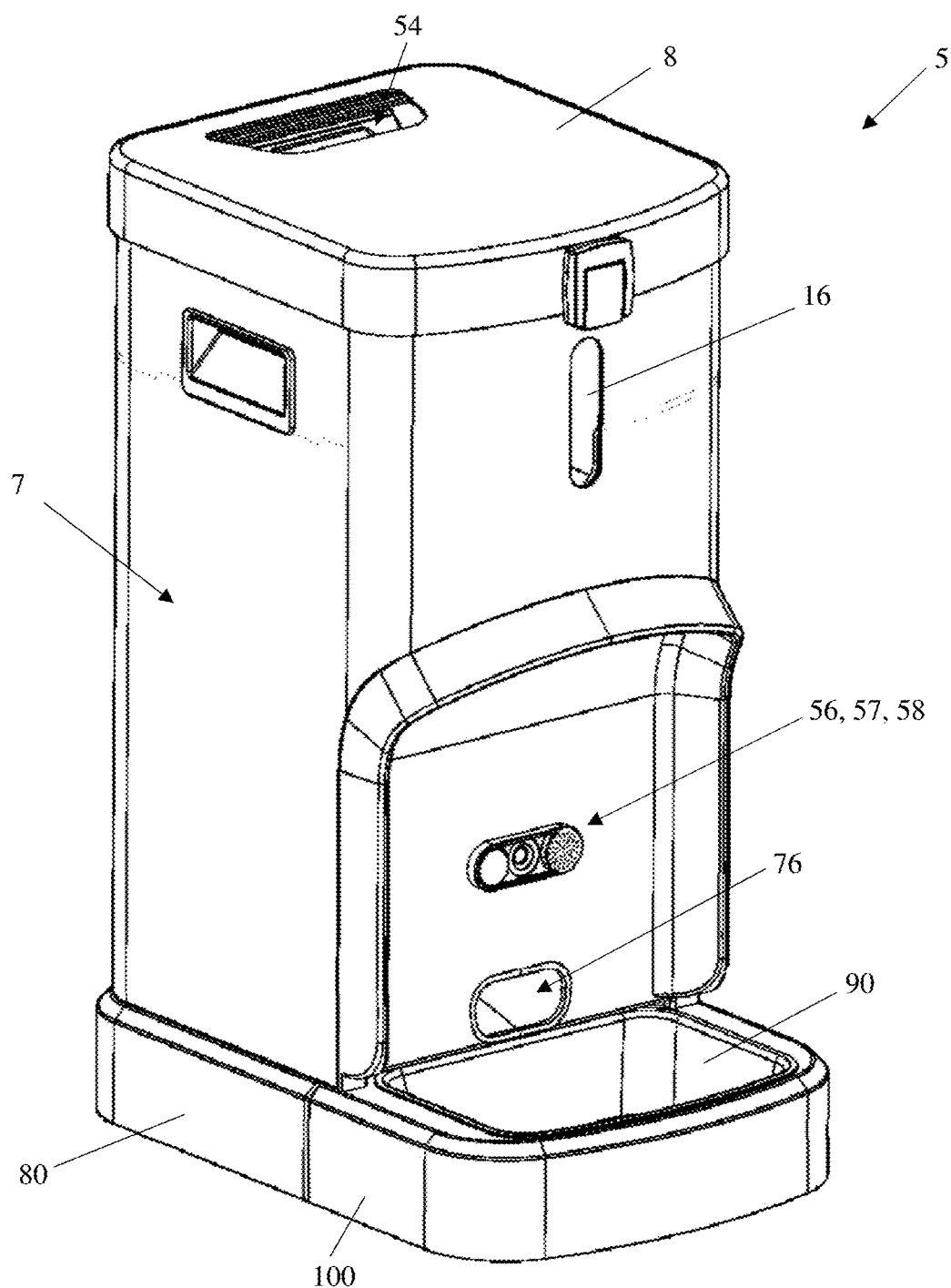
FIG. 1 is a perspective view of an embodiment of a smart pet feeder system in accordance with the present disclosure.
Figure 2:
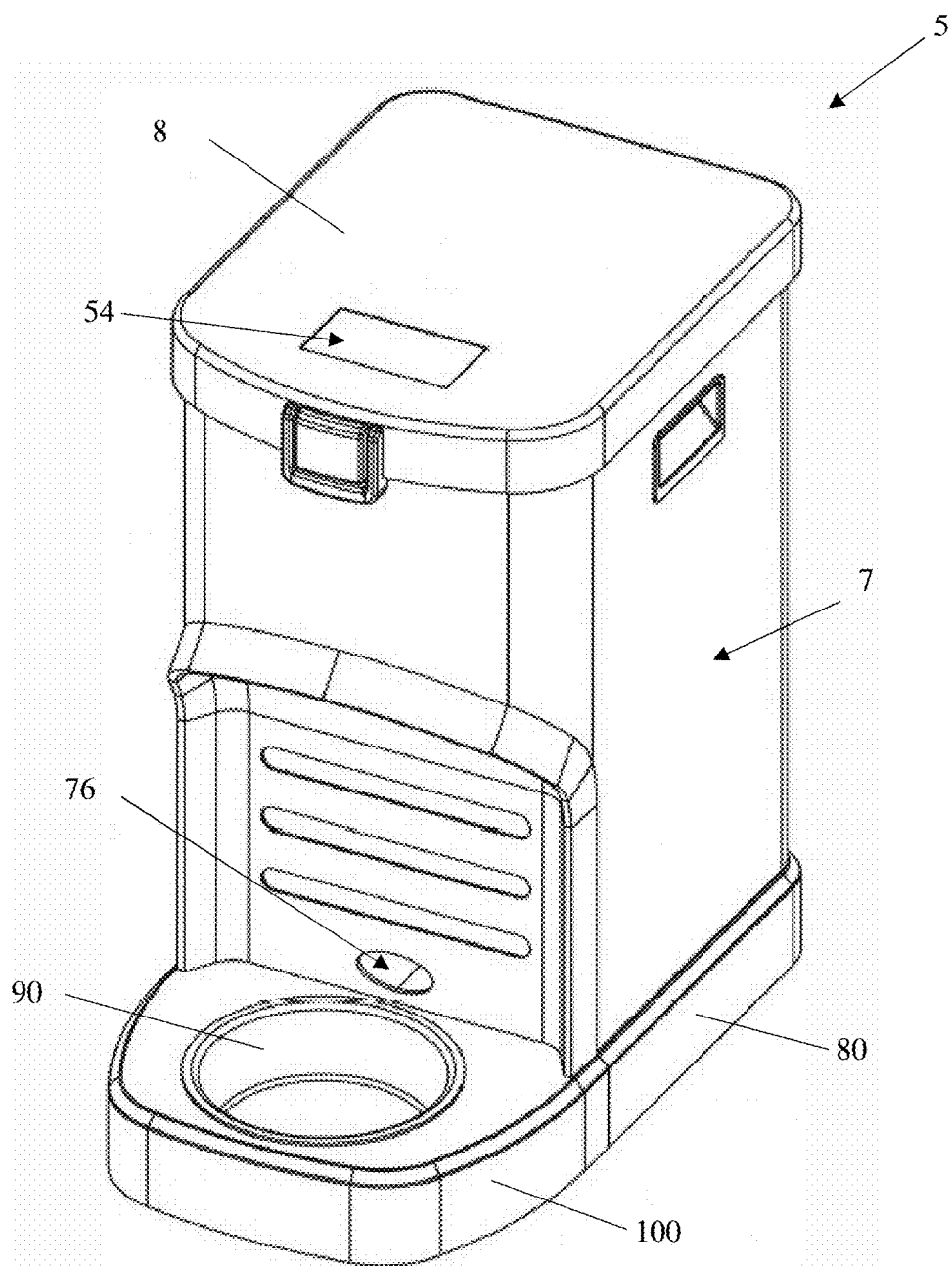
FIG. 2 is a perspective view of another embodiment of a smart pet feeder system in accordance with the present disclosure.
Figure 3:
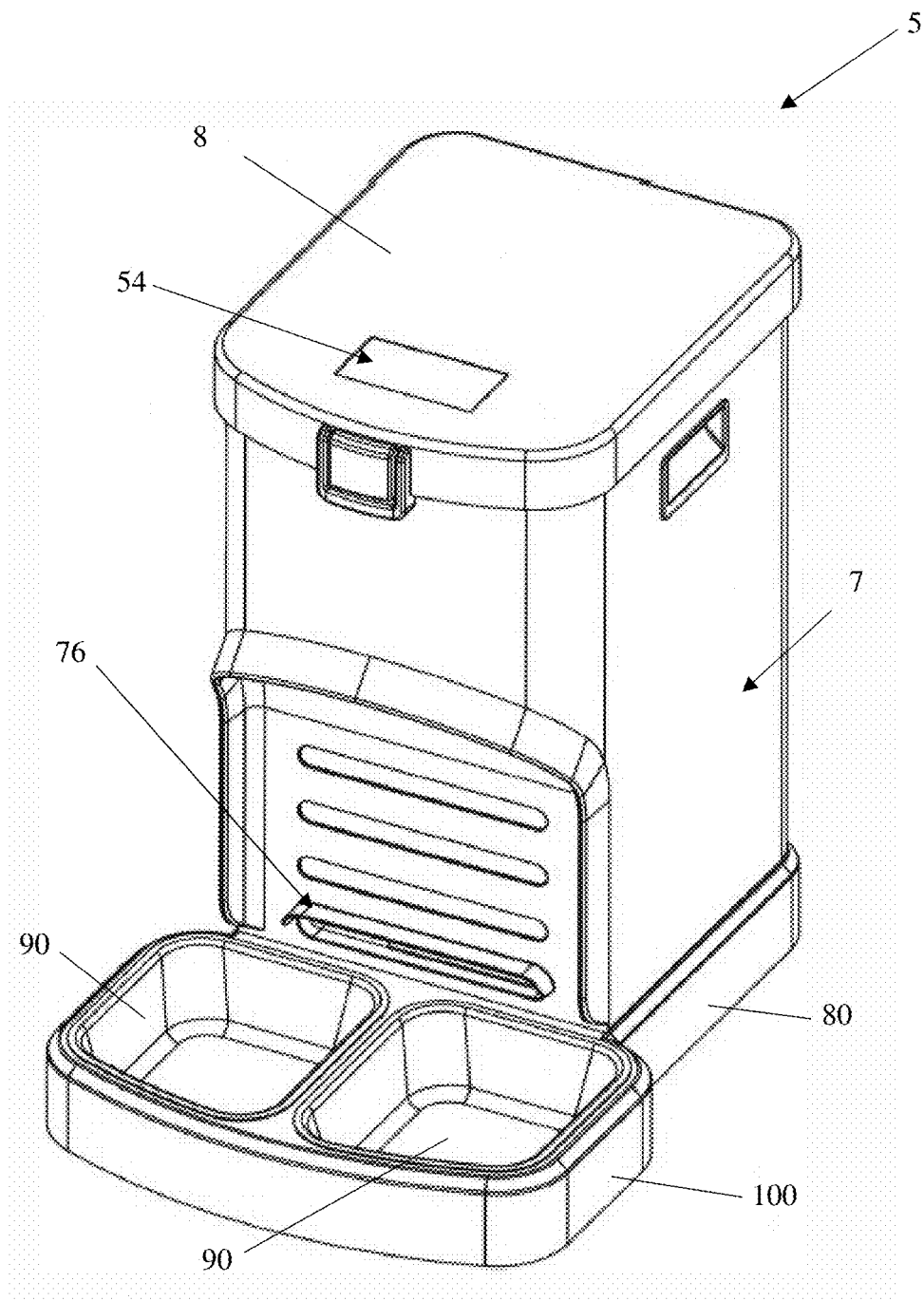
FIG. 3 is a perspective view of another embodiment of a smart pet feeder system in accordance with the present disclosure.
Figure 4:
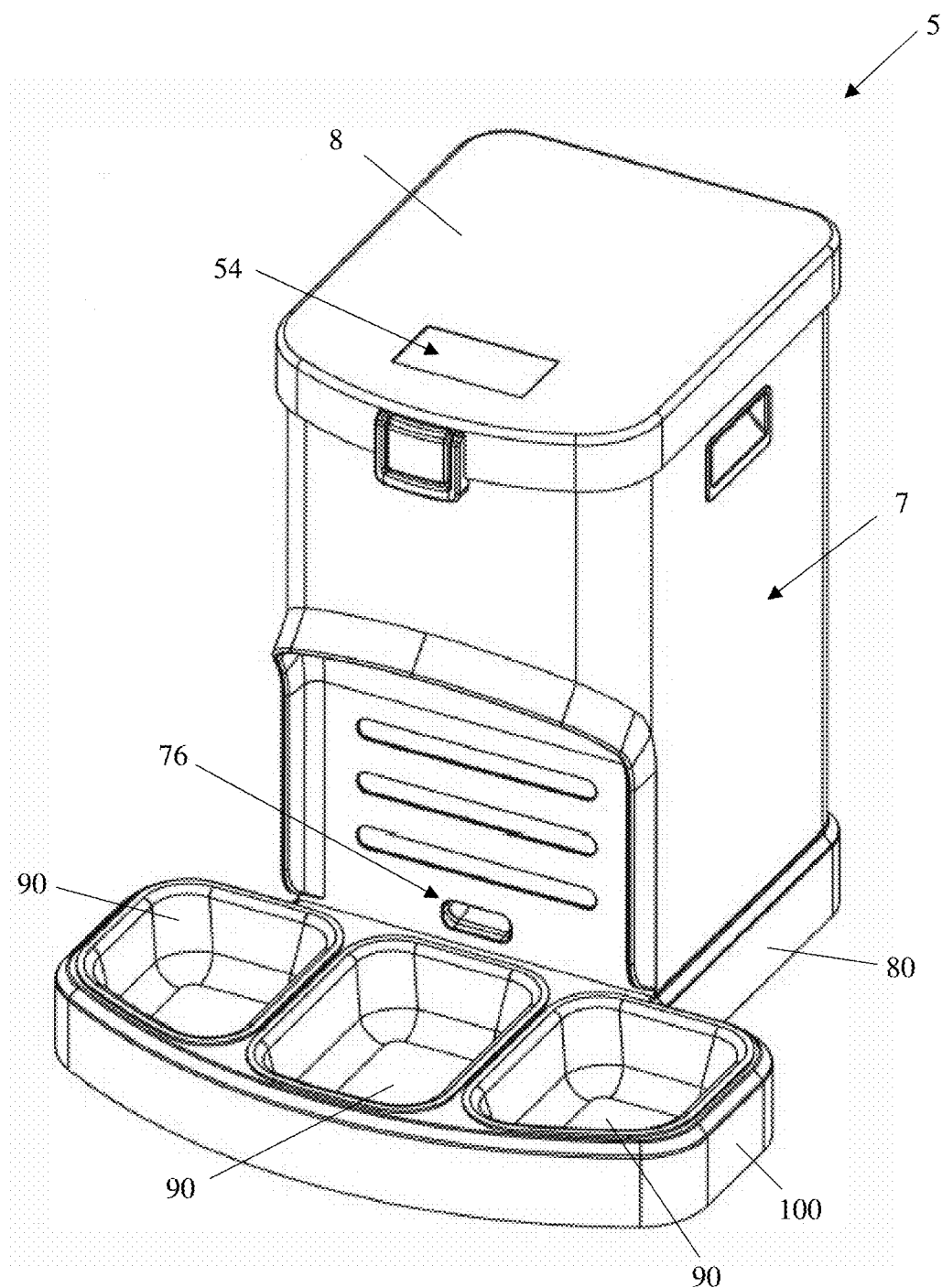
FIG. 4 is a perspective view of another embodiment of a smart pet feeder system in accordance with the present disclosure.
Figure 5:
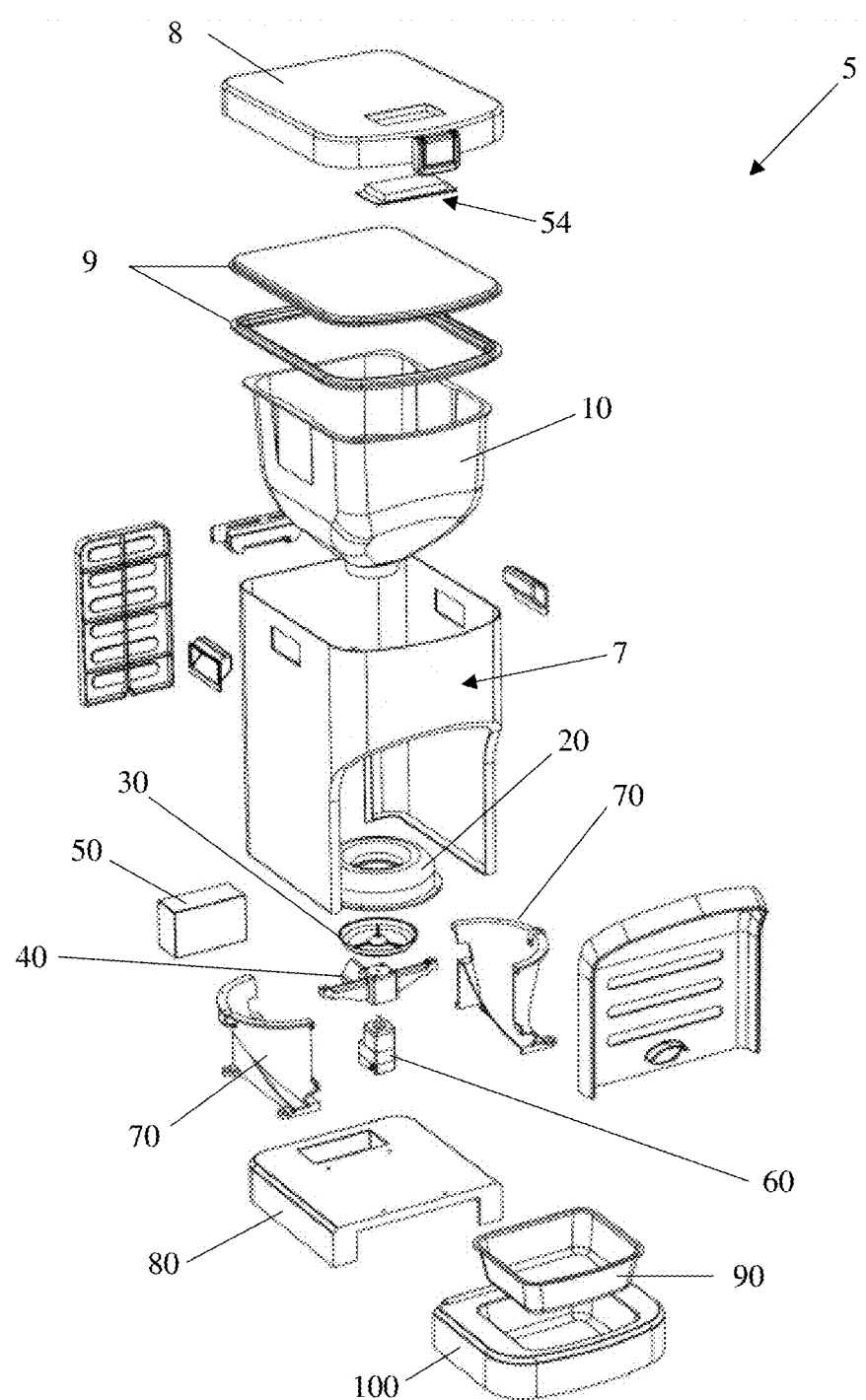
FIG. 5 is an exploded perspective view of an embodiment of a smart pet feeder in accordance with the present disclosure.
Figure 7:
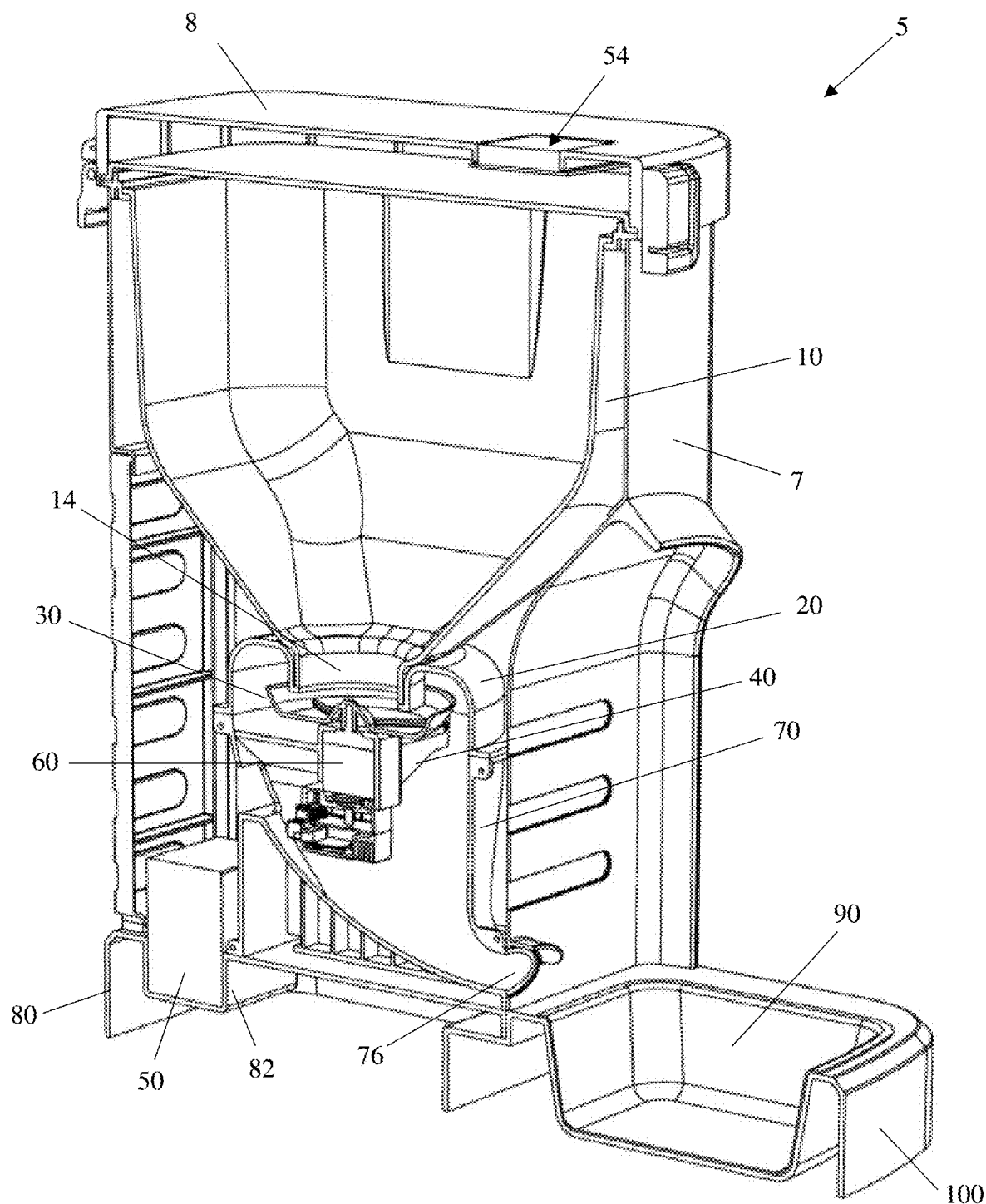
FIG. 7 is a cross-sectional perspective view of the smart pet feeder system of FIG. 5 in accordance with the present disclosure.
Figure 8:
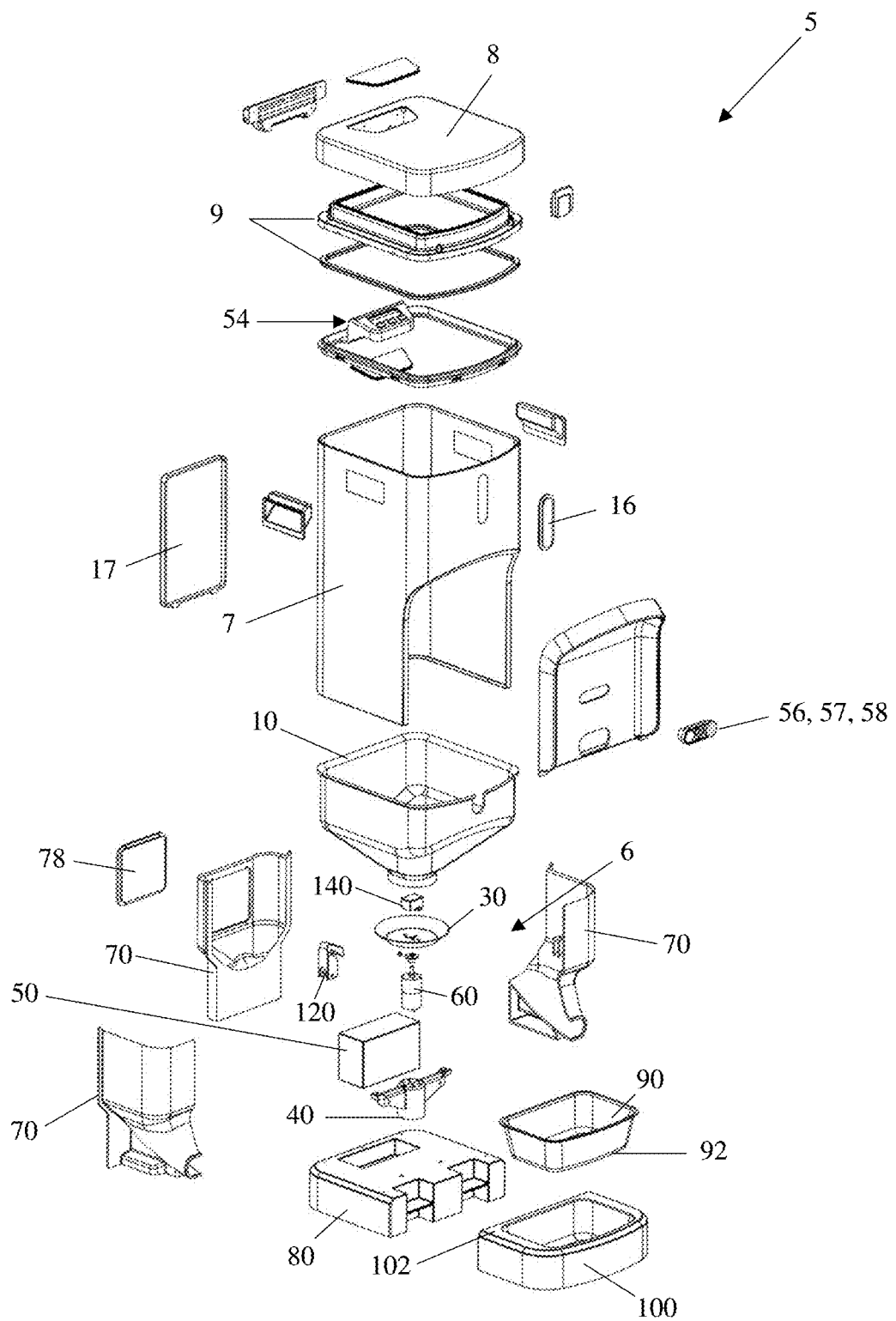
FIG. 8 is an exploded perspective view of the smart pet feeder of FIG. 1 in accordance with the present disclosure.
Figure 9:
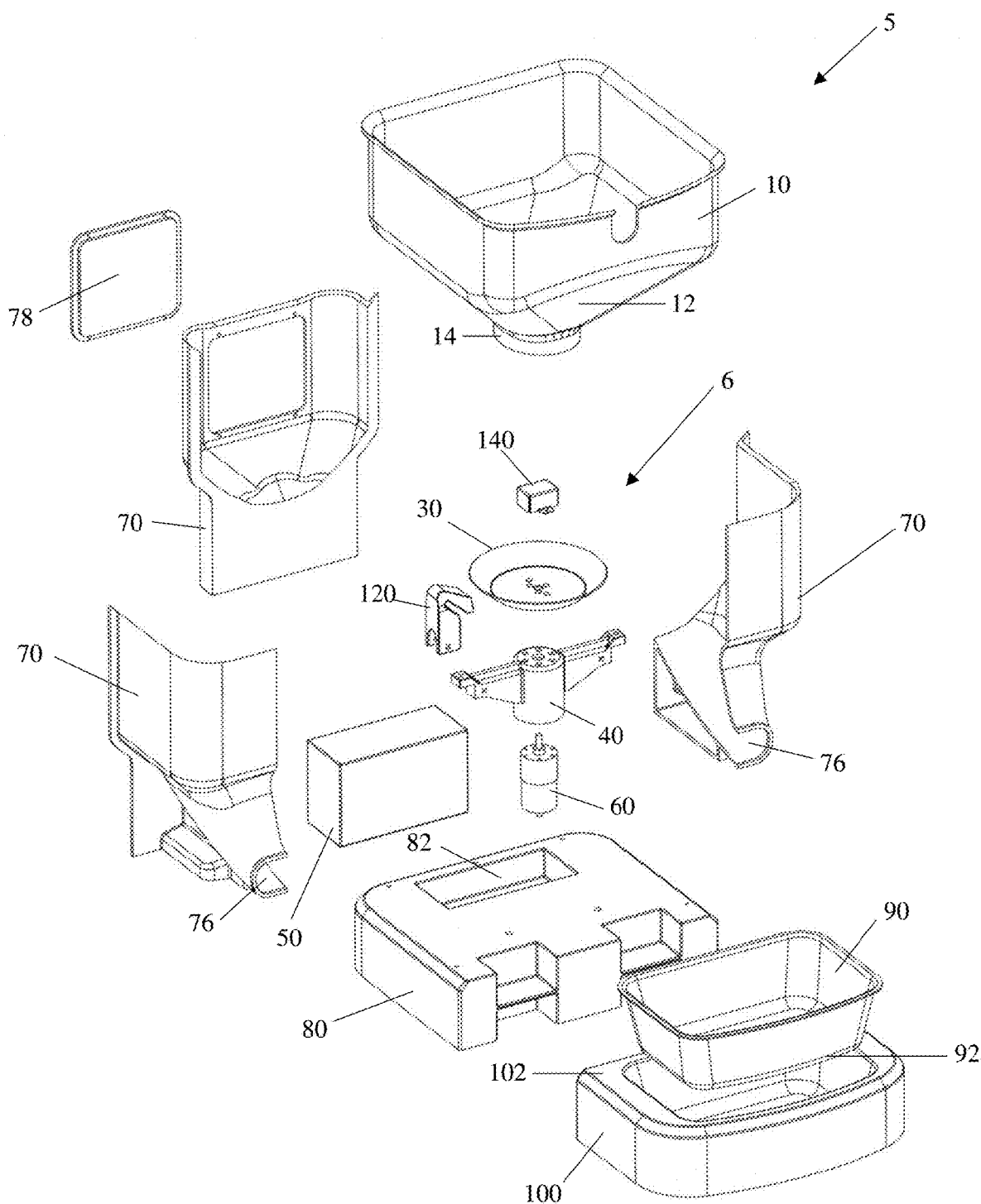
FIG. 9 is an enlarged exploded perspective view of the smart pet feeder system of FIG. 8 in accordance with the present disclosure.
Figure 10:
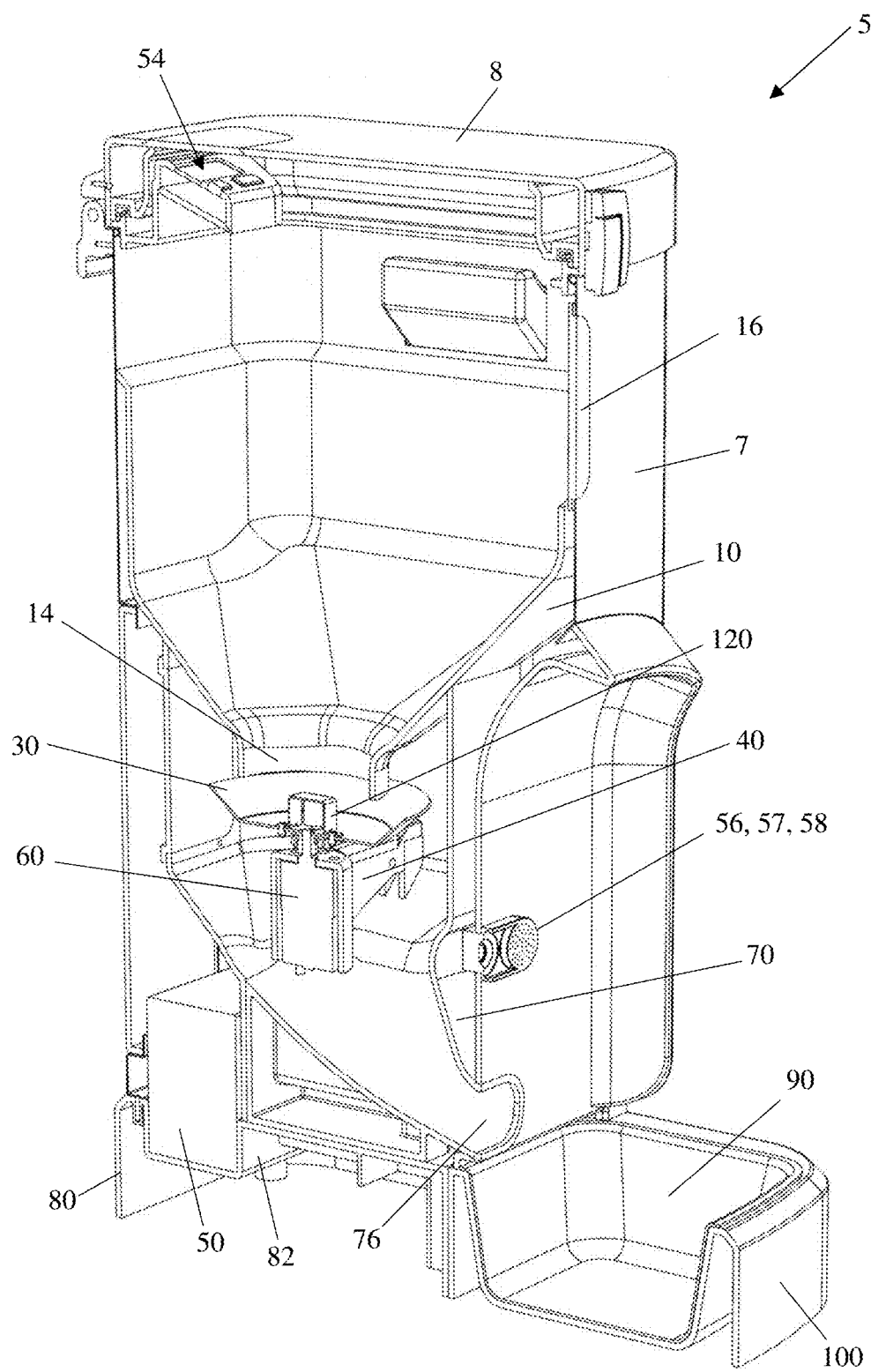
FIG. 10 is a cross-sectional perspective view of the smart pet feeder system of FIG. 8 in accordance with the present disclosure.

The underside of the center housing 42 of the motor bracket 40 may have a recess configured to receive at least a portion of the motor 60, and hole in the top of the motor bracket 40 so the motor 60 can be attached to the spin plate 30. The motor bracket 40 is thus positioned atop the motor 60 and may shield the motor 60 from dispensed feed. In some embodiments, for example, as illustrated in FIGS. 5-7, the motor 60 may be a stepper motor. A stepper motor has low inertia rotors that provide faster acceleration when activated, and low loss stators that have better low speed performance. The use of a stepper motor allows for many evenly spaced windings on its stator which act as magnetic poles when electric power is supplied. The rotor of the stepper motor is made of permanent magnet pairs in a gear shape that provide high torque for more precise and highly reliable movements. The stepper motor may use rare earth magnets. The stepper motor is equipped with an electronic motor controller that switches the current to each successive stator winding to magnetically move the rotor from one pole to the next, for highly accurate control of the rotor for precise and stepwise rotational movements.

One benefit of using a stepper motor is that a stepper motor can be precisely controlled to only turn a defined amount of revolutions. In contrast, when conventional motors as used in other pet feeders are turned on and off, they continue to spin down to stop until friction or inertia stops the motor from turning. Thus, if the conventional motor is turned off, it will spin for some undetermined amount of time. The amount of additional revolutions that the motor may turn the spin plate 30, and thus continue dispensing feed, may depend on the amount of feed in the hopper 10, or the type of food currently being used as this will affect the coefficient of friction on the motor 60. As such, each time the conventional motor is run, even if for a few seconds, different amounts of food may be dispensed.

This may become an issue as many pet owners want to feed their pets a very specific amount, for example, ½ cup, 2 times a day. If ¾ of a cup gets dispensed once, and then ⅝ of a cup later in the day, that can be problematic for a pet and its health. So, most pet owners would prefer precise measurements of feed to be dispensed. The use of a stepper motor 60 may provide more precise control over the release of feed. For example, the stepper motor can be programmed to spin at a certain rate, and what percentage of a revolution is desired. Thus, the stepper motor might turn ⅓ of a revolution, or ½ of a revolution, or 1⅓ revolutions in order to dispense the desired amount of food. When the spin plate 30 is not spinning, no feed is generally being dispensed. The smart pet feeder system 5 may be programmed with the number of revolutions needed to dispense various amounts of feed. These programmed amounts can be based on specific types of dog food (for example, Purina Dog Chow is 2 revolutions for each ¼ cup), or averaged across the most popular dog foods (for example, 2 revolutions for each ¼ cup, on average). The smart pet feeder system 5 may allow the user to select the specific dog food being used from a menu, either on the feeder itself, or selected from a phone application or program), and adjust settings used to dispense the desired amount of food (i.e., 3 revolutions for ½ cup of Brand X, 2.5 revolutions for ½ cup of Brand Y, etc.). Unlike conventional motors, the stepper motors should dispense feed with a small variation between activations. In other words, if ½ cup of food is desired, ½ cup of food, with a +/−10% margin of error, will be dispensed. In a preferred embodiment, the margin of error is +/−only 5%.

As illustrated in FIGS. 1 and 8-10, the feeder housing 7 may include a window 16 for easily checking a level of feed in the hopper 10 without opening the lid 8. In accordance with this embodiment, the feed chute 70 may include two halves and a rear portion, which may all be mated together to form the feed chute 70. In certain optional embodiments, the feeder housing 7 may further include a rear door 17 for enabling access to the battery 50 and the feed chute 70. In other optional embodiments, the feed chute 70 may further include a window 78 for viewing the components of the feed dispensing assembly 6 when the rear door 17 is removed from the feeder housing 7. In certain optional embodiments, the window 78 may be removeable such that the feed dispensing assembly 6 may be accessed for maintenance, cleaning, and/or clearing clogs or jams formed if the feed bunches up.

Figure 12:
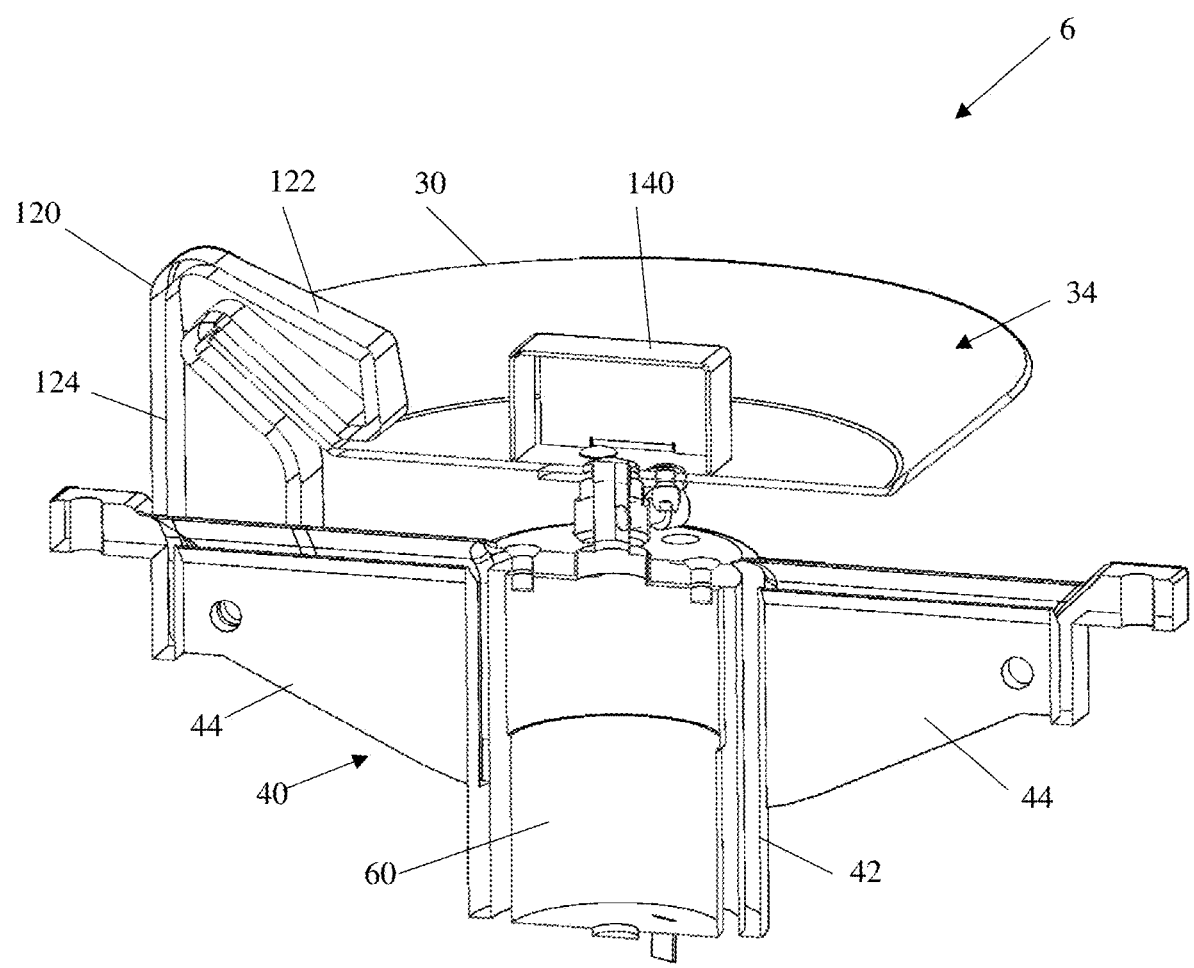
FIG. 12 is a cross-sectional perspective view of the feed dispensing assembly of FIG. 11 in accordance with the present disclosure.

FIGS. 11 and 12 show several views of certain components of another embodiment of a feed dispensing assembly 6 of the smart pet feeder system 5. In this embodiment, the feed dispensing assembly 6 may comprise a spin plate 30, a motor bracket 40, a motor 60, and one or more of a diverter blade 120 or a center spacer 140. The diverter blade 120 may extend along a portion of the spin plate 30. The center spacer 140 may be coupled to the spin plate 30 at the center 36 using conventional means.

The primary function of the spin plate 30 is to receive dog food (also known as kibble or feed) from the hopper 10 and hold the feed in the hopper 10, between feed events. The feed is gravity fed from the hopper 10 onto the spin plate 30. As the spin plate 30 turns, feed may be directed away from a center 36 of the spin plate 30 by the center spacer 140 which positions the feed from the hopper 10 such that either centrifugal forces may take effect or the mechanical interactions between the various components of the feed dispensing assembly may push the feed over the edge of the spin plate 30. The feed may be controllably redirected off, or ejected from, the spin plate 30 using the diverter blade 120. The diverter blade 120 may mechanically force the feed over the upwardly angled outer rim portion 34 of the spin plate 30 as it spins such that the feed may then travel down into the feed chute 70.

In certain optional embodiments, the spin plate 30 may have a diameter of five-point-five inches and an overall height of zero-point-seven-five inch. In other optional embodiments, the diameter and overall height of the spin plate 30 may be greater than or smaller than the previous described dimensions based on specific needs or uses of the feed dispensing assembly 6, or for example, to accommodate different motor speeds and/or dog food kibble sizes. The outer walls (e.g., the upwardly angled outer rim portion 34) of the spin plate 30 may be set at an angle relative to the bottom portion. The angle may vary between 100 degrees to 160 degrees, generally depending on the desired output of the smart pet feeder system 5. The large diameter and angle of the outer walls of the spin plate 30 may prevent feed from inadvertently bouncing on the spin plate 30 and going over the edge and down into the feed chute 70, into the bowl 90 when feed is added to an empty hopper 10 and spin plate 30.

The spin plate 30 may be made from various materials including formed aluminum, stainless steel, some other metal alloy, or from injection molded or vacuum formed plastic. A machined hub 62 may be riveted or otherwise attached using removeable fasteners to the center 36 of the spin plate 30. The hub 62 may be designed to slide over the motor shaft which has a 'flat' spot on one side of the shaft. A set screw 64 may be used to lock the spin plate to the motor shaft by tightening the set screw 64 against the flat on the motor shaft. This arrangement may enable the spin plate 30 to be raised or lowered slightly on the motor shaft, thereby enabling the smart pet feeder system 5 to accommodate different sized feed (e.g., between the lower opening 14 of the hopper 10 and the spin plate 30. In certain optional embodiments, the diverter blade 120 may also be adjustable vertically to maintain its relationship with the spin plate 30.

The primary purpose of the diverter blade 120 may be to force feed from the spin plate 30 into the feed chute 70 in a controlled manner (e.g., as the feed centrifugally moves towards the edges of the spin plate 30 and/or is mechanically forced towards the edges using the center spacer 140 and diverter blade 120 while spinning). The diverter blade 120 may include a feed engagement portion 122 and a mounting portion 124. The feed engagement portion 122 may extend along at least a portion of the spin plate 30 (e.g., at least the upwardly angled outer rim portion 34). The mounting portion 124 may be configured to couple to the motor bracket 40 (e.g., at one of the two support arms 44) or the hopper 10 (e.g., at the funnel portion 12). As such, the diverter blade 120 may be mounted in a fixed position relative to the rotating spin plate 30, such that the diverter blade 120 does not rotate with the spin plate 30. The feed engagement portion 122 may be designed to redirect the feed over the edge of the spin plate 30 and down into the feed chute 70 as the spin plate 30 rotates during a feed event.

As illustrated in FIGS. 14A-14E, the feed engagement portion 122 of the diverter blade 120 may include a forward edge 126 and a rearward edge 128. The diverter blade 120 may be symmetrical about a center line 130. As such, the forward and rearward edge 126, 128 terminology may be reversable depending upon a rotational direction (e.g., clockwise or counterclockwise) of the spin plate 30. This symmetry also means that the feed dispensing assembly 6 works consistently regardless of the rotational direction of the spin plate 30.

As illustrated in FIG. 14D, each of the forward and rearward edges 126, 128 may be angled relative to the center line 130, when defined parallel to the y-axis (as illustrated in the drawings), at a wedge angle 132. In certain optional embodiments, the wedge angle 132 may be between zero degrees and twenty degrees. In other optional embodiments, the wedge angle 132 may be between about three degrees and about fifteen degrees. In other optional embodiments, the wedge angle 132 may be between about five degrees and about twelve degrees. In other optional embodiments, the wedge angle 132 may be between about seven degrees and about eight degrees. In further optional embodiments, the wedge angle 132 may be about seven-point-eight degrees. In other words, the feed engagement portion 122 may be wedge-shaped have a terminal end width 133 wider than a proximal end width 134.

Figure 14E:
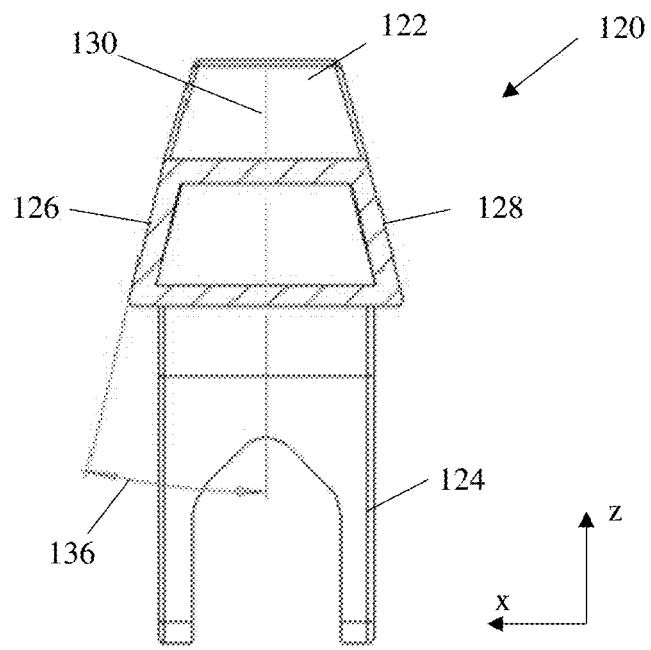

As illustrated in FIG. 14E, each of the forward and rearward edges 126, 128 may be angled relative to the center line 130, when defined parallel to the z-axis (as illustrated in the drawings), at a ramp angle 136. In certain optional embodiments, the ramp angle 136 may be between zero degrees and thirty degrees. In other optional embodiments, the ramp angle 136 may be between about three degrees and about twenty-six degrees. In other optional embodiments, the ramp angle 136 may be between about six degrees and about twenty-two degrees. In other optional embodiments, the ramp angle 136 may be between about ten degrees and about eighteen degrees. In other optional embodiments, the ramp angle 136 may be between about twelve degrees and about sixteen degrees. In further optional embodiments, the ramp angle 136 may be about fourteen-point-one degrees.

The compound angle defined using both the wedge angle 132 and the ramp angle 136 may be designed to help push the feed from the spin plate 30 more effectively than a vertical and/or perpendicular engagement edge.

The dimensions of the diverter blade 120 may vary depending on the size of the smart pet feeder system 5. In certain optional embodiments, the diverter blade 120 may be about one-point-two inches in depth (e.g., parallel to the x-axis) by about two-point-seven inches in height (e.g., parallel to the z-axis) by about one-point-five inches in width (e.g., parallel to the y-axis). Depending on the size of the smart pet feeding system 5, each of the dimensions of the diverter blade may be smaller or larger. The diverter blade 120 may be made from various materials including formed aluminum, stainless steel, some other metal alloy, or from injection molded or vacuum formed plastic.

The diverter blade 120 interacts with the spin plate 30 and center spacer 140 by forcing the feed over the wall of the spin plate 30 and down into the feed chute 70. The diverter blade 120 also interacts with the speed of the motor 60, for example, more feed is dispensed at a faster speed than at a slower speed. The diverter blade 120 design enables precise control of the amount of feed to be dispensed, regardless of the size of the feed. The amount of feed dispensed may be easily adjusted by adjusting the amount of time the spin plate 30 turns against the diverter blade 120.

The purpose of the center spacer 140 may be to prevent feed from accumulating in the center 36 of the spin plate 30. The secondary function of the center spacer 140 is to agitate the feed as it moves from the hopper 10 into the spin plate 30 and then out of the spin plate 30, over the edge and down into the feed chute 70, thereby preventing the feed from bridging-up or creating a jam in the feed flow. The agitation caused by the center spacer 140 also helps break-up any feed that may stick together due to humidity, moisture penetration into the hopper 10 or other means.

The center spacer 140, while illustrated as a rectangle, may be shaped differently in other embodiments, square, triangular, octagonal, hexagonal, conical, or some other geometric configuration. The size of the center spacer 140 can vary in width, length and height depending on the feeding system. For example, the size may vary between about one to two inches wide by about one to two inches long by about zero-point-five to two inches tall. The dimensions, proportion, and shape of the center spacer 140 may be modified to match the particular spin plate 30, diverter blade 120 and/or kibble feed size. The center spacer 140 may be made from various materials including formed aluminum, stainless steel, some other metal alloy, or from injection molded or vacuum formed plastic.

In some embodiments, for example, as illustrated in FIGS. 8-11, the motor 60 may be a gear motor. The gear motor may be connected to a digital timer that runs the motor for a certain period of time (e.g., it is not based on a number of rotations like the stepper motor). When the motor runs, it causes the spin plate to turn, forcing feed against the center spacer 140 and the diverter blade 120 which moves the feed out over the edge of the spin plate 30 and down into the feed chute 70, eventually exiting into the bowl 90.

A gear motor may be advantageous because it has more torque than a standard DC motor and is therefore less likely to stall if feed jams occur. The motor 60 may implement metal or plastic gears, however, metal gears are preferable. The grease in the gear motors may be low-temperature grease for optimum performance when used in low temperature outdoor applications. The operating temperature rating on the gear motor with low temperature grease is −30° C. to 50° C. or −22 F to 122 F.

The speed of the gear motor may vary depending on the feeding application and size of material being moved. The speed of the gear motor may be as low as 5 RPM to as high as 100 RPM or greater. The speed of the motor 60 can is adjustable, but generally should not fling feed from the spin plate 30 using excessive centrifugal forces. The feed should exit the spin plate 30 in a controlled manner so as to increase the serving size consistency. In certain optional embodiments, the motor 60 may be configured to spin at speeds between about 10 RPM and about 50 RPM. In other optional embodiments, the motor 60 may be configured to spin at speeds between about 15 RPM and about 45 RPM. In other optional embodiments, the motor 60 may be configured to spin at speeds between about 20 RPM and about 40 RPM. In other optional embodiments, the motor 60 may be configured to spin at speeds between about 22.5 RPM and about 37.5 RPM. In other optional embodiments, the motor 60 may be configured to spin at speeds between about 25 RPM and about 35 RPM. In other optional embodiments, the motor 60 may be configured to spin at speeds between about 27.5 RPM and about 32.5 RPM. In further optional embodiments, the motor 60 may be configured to spin at a speed of about 30 RPM.

As described above, the motor 60 can be adjusted vertically if desired, by adding or removing spacers at the two attachment points of the motor bracket 40. Adjusting the motor 60 on the mounting bracket 40 provides a means to increase or decrease space between the lower opening 14 of the hopper 10 and the spin plate 30, to accommodate larger or smaller feed.

The gear motor 60 interacts with the spin plate 30, center spacer 140, and the diverter blade 120 by turning the spin plate 30 and center spacer 140 at a defined speed that forces the feed against the diverter blade 120, causing the smart pet feeder system 5 to dispense a precise amount of feed over a period of time.

The smart pet feeder system 5 may include a controller 54 configured to control the motor 60. The controller 54 may also be referred to herein as a control panel or circuit board. The circuit board may include the necessary software or firmware to program and operate the motor 60, either through the feeder controls or through the mobile application described further below. The circuit board when operatively connected to the stepper motor embodiment allows instructions to the stepper motor for precise revolutions, e.g., turn 2 revolutions, or 1 and ⅛ revolutions, etc. The circuit board when operatively connected to the gear motor embodiment allows instructions to the gear motor for precise control of an amount of time the motor is activated.

For simplicity and ease of understanding, the figures show the mechanical components of various embodiments of the feeder, without showing any video screen, LCD, or computer hardware, software, and/or firmware to enable the "smart" features described herein. However, those smart features, described further below, are included in certain embodiments of the feeder.

The feeders can have a control panel 54 with a screen and/or buttons to program operations of the feeder, for example, feed times. In some embodiments, the feeder has hardware, software, and/or firmware, and wireless communication capabilities, to interact with, and receive instructions and/or programming from a website, smart digital assistant such as Amazon Alexa or Apple Siri, or a mobile application. For example, the feeder can be operatively connected via Wi-fi to a smart digital device where users could trigger a feeding using a voice command, or from a mobile app where users could open the app and set or change feed times, trigger a feeding, turn on a video screen or speaker on the feeder, etc.

In some embodiments, the feeder can have a video screen (not illustrated) that allows a user to display a picture or live or recorded video of the user to the pet. In other embodiments, the feeder can have a video camera 56 that allows the user to see recorded or live video from the feeder, normally looking toward the feed bowl so the user can see the pet. In some embodiments, the feeder can have speakers 57 and/or a microphone 58 to allow the user to hear any sounds made by the pets, or to allow the user to talk (remotely) to the pet via the microphone integrated with the feeder. Any combination of the foregoing can be implemented and integrated with the feeder. In some embodiments, the feeder allows the user to either record a user, or allow a user to upload to recording. These recordings might be the user calling their pet's name and telling the pets something like, "Spot, come get your breakfast! Time to Eat!" In these embodiments, a speaker can play the audio files at the desired time, for example, right before or right after a feeding is dispensed, or upon a user command.

With regard to powering the feeder, it can be run off a 12 volt battery, other battery size, or plugged into an outlet. In the embodiment designed to be plugged into an outlet, the feeder can have battery backup, for example a 12-volt rechargeable battery with a trickle charger, or other battery size. In other embodiments, a 5 volt or 6-volt battery can be used. In the preferred embodiment using a stepper motor, the feeder can be powered by a 12-volt rechargeable battery and has an integrated printed circuit board (PCB) to control the stepper motor and number of revolutions (using a pulse signal).

With regard to controls for the feeder, the feeder may include an integrated clock, and more preferably a Wi-fi auto clock set, and with automatic updates for any daylight savings changes. The time for feedings, and the amount of feed to be dispensed, can be input using any type of standard keypads or control pads, preferably with an LCD display screen, and various menus with which users can select desired options. The feeder can have a variety of preset feeding times that the user can select, or the user can program the time(s) of the desired feedings. A user can set multiple different feeding times, with more feedings allowing for smaller amounts provided to pets each time. This may be desirable for certain dietary plans for some pets. The feeding schedule can be programmable to allow the ability to set different feed amounts or different feed times on different days, for example, weekdays at 6 am & 5 pm, weekends at 7:30 am & 5 pm.

The feeder will provide feed calibration where a user can hold a button down, or otherwise trigger the feeder to dispense a certain amount of feed based on the type of feed and size of kibble being dispensed and or by user preference or a measured amount of feed. For example, the feeder can have a "feed now" button or trigger that dispenses feed as long as the user holds the button. The user can also store that specific amount of feed on a preset so that once that they decide a certain amount of feed is correct, they can associate that with a feed setting #1, or feed setting #2, so that future feedings can be made just selecting that specific feed setting. The system can also identify to the user that X amount of food was or is dispensed for a feed setting, or when the "feed now" button is held down by the user. The feeder can also have pre-programmed settings for pre-set amounts of feed, for example a setting for ½ cup of feed, a setting for 1 cup of feed, etc. The feeder can also have a "feed now" capability that may be triggered manually through a keypad on the feeder, or remotely through the wireless connectivity. This "feed now" capability can be programmed to dispense a predetermined amount of food, or to dispense for so long as the user triggers the "feed now" control. The feeder can also be preprogrammed to have a predetermined "treat" feeding that might dispense some smaller amount as a "treat" for the pet, a smaller amount than a regular feeding.

The feeder may include a low feed sensor or indicator that gives an indication to the user when the feed level in the hopper reaches a certain level so the user can add more food to the hopper. The low feed sensor can trigger or activate some sort of indicator light, or audible noise to the user, and/or it can send a message to the user through the wireless communication to the user's app so the user receives a notification on his or her smart devices, like a tablet, mobile phone or smart digital assistant. The user may also be able to access the feed level remotely through said wireless devices.

The feeder can have integrated connectivity and voice command and control similar to other smart devices like Amazon's Alexa and Google Home, so that a user can provide voice commands to the feeder to trigger a feeder or provide a "treat" feeding.

As described above, the feeder can have a visual display screen, which can be as basic as a small LCD screen that allows a user to provide basic programming, to a video screen that shows a video feed. The display screen may also have a child lock feature which prevents the feeder from being changed or shut off unless some specific code, or button is held down or combination is used to unlock the controls.

The feeder may have one or more lights and indicators. In some embodiments the feeder has an "on" indicator that shows users that the system has power and is operating normally. The feeder may have an "error" or "problem" light that blinks, or provides a separate color (like red or yellow)

if there are any problems detected in the system. The system can have lights shining on the feed area, and preferably a dimmable night light that illuminates the feed area. As described above, there can also be low feed indicators, for example a light that shows green when full, yellow when it's time to refill, or getting low, and red when the feed level is very low or empty. Tones or sounds can also be used, for example, the feeder might emit a certain sound or tone at feeding times. This might be used as an alternative to a user's recorded voice.

In some embodiments the feeder has a motion sensor that can automatically trigger a separate and automatic video recording feed through the mobile application, for example, like a Ring camera application, e.g., when a pet is detected near the feeder, a user is notified and/or live video feed provided. It can also offer an audio feed (1 way or 2 way) with the feeder to allow a user to talk to their pet through the feeder. The user may be able to replay previously recorded video and hear the audio of previous motion events recorded through the feeder. The feeder may also have a night vision camera so the camera will record in low-light conditions and users can see their pets at night. The feeder is preferably Wi-Fi enabled, at 2.4 GHz, 5 GHz and/or 6 GHz. In some embodiments, the feeder also has Bluetooth connectivity to interact with other devices and networks.

Some users may have multiple pets that use the same feeder, but have different dietary requirements. And, in some outdoor locations, there may be wild animals in the area that may try to eat food that is dispensed but not yet eaten (for example a raccoon). In some embodiments, the feeder is configured to recognize or detect different pets to be fed. This can be done by using a microchip or other device that emits a signal that can be detected by the feeder. Thus, the feeder can be programmed to feed only if the microchip (perhaps attached to the pet's collar) is detected. And, the feeder can be programmed to have different feed routines and different feed amounts for different microchips. So, microchip #1 might be on an 80 lb dog that gets 1 cup of food twice a day, and microchip #2 might be for a 20 lb dog that gets ½ cup of food twice a day. The system can be programmed to dispense the first feeding when the dog's presence is detected between, for example, 6 am and 10 am, and dispense the second feeding when the dog's presence is detected between, for example, 4 pm and 6 pm. The system can be programmed to set a distance at which the pet must be (or the microchip or signal generator) before feed is dispensed, or that must be detected for a certain length of time, so that the feed is not dispensed when the pet just walks by the bowl, or is sitting across the room. In some embodiments, rather than using a microchip, the feeder may utilize a camera and artificial intelligence (AI) pet recognition.

The controller 54 further includes or may be associated with a processor, a computer readable medium, and data storage such as for example a database network. It is understood that the controller 54 described herein may be a single controller having some or all of the described functionality, or it may include multiple controllers wherein some or all of the described functionality is distributed among the multiple controllers.

Various operations, steps or algorithms as described in connection with the controller 54 can be embodied directly in hardware, in a computer program product such as a software module executed by the processor, or in a combination of the two. The computer program product can reside in RAM memory, flash memory, ROM memory, EPROM memory, EEPROM memory, registers, hard disk, a removable disk, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The communication unit may support or provide communications between the controller 54 and external communications units, systems, or devices, and/or support or provide communication interface with respect to internal components of the smart pet feeder system 5. The communications unit may include wireless communication system components (e.g., via cellular modem, WiFi, Bluetooth or the like) and/or may include one or more wired communications terminals such as universal serial bus ports.

The data storage as further described herein may, unless otherwise stated, generally encompass hardware such as volatile or non-volatile storage devices, drives, electronic memory, and optical or other storage media, as well as in certain embodiments one or more databases residing thereon. Other data storage options include cloud-based storage, which may be used to store photos and videos.

It will be appreciated that the feed dispensing assembly 6 may be utilized for dispensing foodstuffs or other granular objects other than pet food (or kibble) in other or similar industries.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

Although embodiments of the present invention have been described in detail, it will be understood by those skilled in the art that various modifications can be made therein without departing from the spirit and scope of the invention as set forth in the appended claims.

A controller, computing device, or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The previous detailed description has been provided for the purposes of illustration and description. Thus, although there have been described particular embodiments of a new and useful invention, it is not intended that such references be construed as limitations upon the scope of this disclosure except as set forth in the following claims.

What is claimed is:

1. A smart pet feeder system, comprising:
a hopper;
a spin plate configured to receive feed from the hopper;
a diverter blade extending along an upper portion of the spin plate, the diverter blade including a feed engagement portion having forward and rearward edges angled relative to a center line of the diverter blade at a ramp angle between zero degrees and thirty degrees;
a motor attached to the spin plate, wherein the motor is operatively connected to a programable circuit board; and
a feed chute configured to receive feed from the spin plate and direct the feed to a bowl.

2. The smart pet feeder system of claim 1, wherein:
the hopper includes an oval-shaped lower opening.

3. The smart pet feeder system of claim 1, further comprising:
a center spacer positioned on the spin plate, the center spacer configured to divert feed away from a center of the spin plate.

4. The smart pet feeder system of claim 3, wherein:
the center spacer is rectangular-shaped.

5. The smart pet feeder system of claim 1, further comprising:
a motor mount coupled to the feed chute and configured to receive the motor, wherein the diverter blade is coupled to the motor mount.

6. The smart pet feeder system of claim 1, wherein:
the spin plate includes an upwardly angled outer rim portion; and
the feed engagement portion of the diverter blade extends along at least the upwardly angled outer rim portion.

7. The smart pet feeder system of claim 1, wherein:
the feed engagement portion of the diverter blade is wedge-shaped having a terminal end width wider than a proximal end width.

8. The smart pet feeder system of claim 1, further comprising:
a motor mount coupled to one of the feed chute or the hopper and configured to receive the motor.

9. The smart pet feeder system of claim 8, wherein:
the motor is one of a stepper motor or a gear motor.

10. A feed dispensing assembly for a smart pet feeder system including a hopper and a feed chute configured to direct feed towards a bowl, the feed dispensing assembly comprising:
a spin plate configured to receive feed from the hopper;
a motor mount configured to be supported by one of the hopper or the feed chute;
a motor received by the motor mount and attached to the spin plate, the motor configured to cause the spin plate to rotate; and
a diverter blade coupled to the motor mount, the diverter blade including a feed engagement portion configured to extend along at least a portion of the spin plate for redirecting the feed received by the spin plate off of the spin plate, the feed engagement portion including forward and rearward edges angled relative to a center line of the diverter blade at a ramp angle between zero degrees and thirty degrees.

11. The feed dispensing assembly of claim 10, wherein:
the motor mount includes at least one support arm; and
the diverter blade including a mounting portion coupled to the at least one support arm of the motor mount.

12. The feed dispensing assembly of claim 10, further comprising:
a center spacer positioned on the spin plate, the center spacer configured to divert feed away from a center of the spin plate.

13. The feed dispensing assembly of claim 10, wherein:
the feed engagement portion of the diverter blade includes forward and rearward edges angled relative to a center line of the diverter blade at a wedge angle between zero degrees and twenty degrees.

14. The feed dispensing assembly of claim 10, wherein:
the spin plate includes an upwardly angled outer rim portion; and
the feed engagement portion of the diverter blade extends along at least the upwardly angled outer rim portion.

15. A smart pet feeder system, comprising:
a hopper;
a spin plate configured to receive feed from the hopper;
a diverter blade extending along an upper portion of the spin plate, the diverter blade including a feed engagement portion having forward and rearward edges angled relative to a center line of the diverter blade at a wedge angle between zero degrees and twenty degrees;
a motor attached to the spin plate, wherein the motor is operatively connected to a programable circuit board; and
a feed chute configured to receive feed from the spin plate and direct the feed to a bowl.

16. The smart pet feeder system of claim 15, further comprising:
a center spacer positioned on the spin plate, the center spacer configured to divert feed away from a center of the spin plate.

17. The smart pet feeder system of claim 16, wherein:
the center spacer is rectangular-shaped.

18. The smart pet feeder system of claim 15, further comprising:
a motor mount coupled to the feed chute and configured to receive the motor, wherein the diverter blade is coupled to the motor mount.

19. The smart pet feeder system of claim 15, wherein:
the spin plate includes an upwardly angled outer rim portion; and
the feed engagement portion of the diverter blade extends along at least the upwardly angled outer rim portion.

20. The smart pet feeder system of claim 15, wherein:
the feed engagement portion of the diverter blade is wedge-shaped having a terminal end width wider than a proximal end width.

* * * * *